United States Patent [19]

Watanabe

[11] 4,405,689
[45] Sep. 20, 1983

[54] ULTRAVIOLET-CURING COMPOSITION, PREPREG SHEET CONTAINING THE SAME, AND METALLIC MATERIAL HAVING ANTICORROSIVE COATING

[75] Inventor: Hideo Watanabe, Yugawaramachi, Japan

[73] Assignee: The Yokohama Rubber Co., Ltd., Tokyo, Japan

[21] Appl. No.: 328,628

[22] Filed: Dec. 8, 1981

Related U.S. Application Data

[62] Division of Ser. No. 219,935, Dec. 24, 1980, Pat. No. 4,377,458.

[30] Foreign Application Priority Data

Dec. 26, 1979 [JP] Japan .................. 54-169907

[51] Int. Cl.³ .............................................. B32B 15/08
[52] U.S. Cl. .................................. 428/467; 427/54.1;
428/413; 428/415; 428/417; 428/418;
428/425.8; 428/426; 428/430; 428/431;
428/440; 428/441; 428/458; 428/463; 428/480;
428/482
[58] Field of Search ............... 428/36, 268, 378, 413, 428/415, 425.8, 458, 431, 463, 480, 482, 430, 440, 441, 417, 418

[56] References Cited

U.S. PATENT DOCUMENTS 3,963,798  6/1976  Miller ........................ 204/159.16
3,992,276  11/1976 Powanda et al. .......... 204/159.16
4,288,527  9/1981  Morgan ...................... 430/288

FOREIGN PATENT DOCUMENTS 50-154391 12/1975 Japan .

Primary Examiner—Theodore L. Pertilla
Attorney, Agent, or Firm—Armstrong, Nikaido, Marmelstein & Kubovcik

[57] ABSTRACT

An ultraviolet-curing composition comprising an ultraviolet-curing resin having active OH group or COOH group, a vinyl monomer, a thickening agent and a photo-sensitizer. A prepreg sheet containing the composition. A metallic material having anticorrosive coating which comprises a metallic material coated with a coating material mainly comprising petrolatum and further with another coating material mainly comprising the above composition. A metallic material having an anticorrosive coating which comprises a metallic material on the surface of which a rust-proof paint layer is provided and the surface of which layer is further coated with a coating material mainly comprising the above composition. The above composition and prepreg sheet are useful for the lining of metallic members of frame-work and structures.

7 Claims, 5 Drawing Figures

ULTRAVIOLET-CURING COMPOSITION, PREPREG SHEET CONTAINING THE SAME, AND METALLIC MATERIAL HAVING ANTICORROSIVE COATING

This is a division of application Ser. No. 219,935, filed Dec. 24, 1980 now U.S. Pat. No. 4,377,450.

FIELD OF THE INVENTION

The present invention relates to an ultraviolet-curing composition and a prepreg sheet and a metallic material coated with anticorrosive film containing the same which are suitable for the lining of metallic members of frame-work and structures.

BACKGROUND OF THE INVENTION

As processes for the anticorrosive treatment of metallic members of frame-work and structures, there have been employed rubber lining process, resin lining process and organic or inorganic coating process. Processes for the resin lining which have been employed particularly popularly are as shown below:

(1) Cold-curing FRP lining with a liquid resin:

An article to be treated such as a metallic member of frame-work is lined by means of the lamination with a glass fiber base impregnated with (a) a liquid resin composition obtained by dissolving an unsaturated polyester resin in a vinyl monomer such as styrene and incorporating a peroxide which is decomposed at ambient temperature such as methyl ethyl ketone peroxide (MEK PO) therein as hardening agent, (b) a composition obtained by dissolving epoxy(metha)acrylate resin (vinyl ester resin) in a vinyl monomer such as styrene and incorporating MED.PO therein as hardening agent or (c) a liquid resin composition comprising a liquid epoxy resin and an amine cold-setting hardening agent such as a primary or tertiary amine, and then it is cured at ambient temperature.

This process has the following problems: Working time is limited within a short period of time, since the cold-setting resin composition is used. Working environment is bad, since the liquid resin and monomer are used for the impregnation molding. The composition is not uniform, the lining thickness is uneven and quality of the lining material is unstable, since the weighing and mixing are effected in situ and the lamination is effected by coating by hand.

(2) Lining process by coating with liquid resin:

As the liquid resin lining processes, there may be mentioned a process wherein a liquid resin such as the above described cold-setting unsaturated polyester resin, vinyl ester resin, epoxy resin or urethane resin is applied to an article by means of a brush or by spraying; and a process wherein a liquid resin composition comprising an ultraviolet-curing resin such as an unsaturated polyester resin, vinyl ester resin or urethane acrylate incorporated with a vinyl monomer, photosensitizer, pigment, etc. is applied to an article by means of a brush or by spraying and then the coating film is cured by means of an ultraviolet irradiation device. However, the coating films obtained by these processes are thin. Their thickness is about 10-200μ. Their anticorrosive effect does not last for a long period of time. The coating films are not highly resistant to a shock caused by an external force. By these processes, it is quite difficult to form a thick coating film having a high durability.

(3) Lining process by coating with thermosetting prepreg sheet:

An article to be treated is lined with a solid prepreg sheet obtained by impregnating a fibrous base with a liuquid composition comprising a solid or semi-solid, unsaturated polyester resin, vinyl ester resin or epoxy resin added with suitable amounts of a diluting agent, a heat-active latent curing agent and a solvent and removing the solvent by drying or with a solid prepreg sheet (generally called SMC) obtained by impregnating a glass fiber base with a liquid composition comprising an unsaturated polyester resin containing terminal or side chain COOH groups or vinyl ester resin added with a vinyl monomer, MgO, a heat-active organic peroxide and calcium carbonate or another filler, and then the sheet is cured by hot air, infrared rays or a hot press.

However, such a thermosetting prepreg sheet is not cured unless it is heated and, therefore, the application thereof to an article of a high heat capacity such as a large tank, pipe or structure is difficult. Further, it must be kept at a low temperature during the storage, since it is gradually cured even at ambient temperature during the storage for a long period of time.

Thus, the conventional resin linings have many problems due to properties of the resins used. Under the circumstances as above, a resin composition suitable for the use as lining and free from the above problems has been demanded. Further, the development of a prepreg sheet containing such a resin composition and suitable for lining has also been demanded.

As coating materials for preventing metals from corrosion, there have been used tapes and sheets comprising woven or non-woven fabrics of synthetic fibers or glass fibers impregnated with petrolatum.

The petrolatum coating materials have been used broadly, since they are not cured or decomposed during the storage for a long period of time.

The petrolatum anticorrosive tapes are not cured or decomposed with time and their anticorrosive properties are maintained for a long period of time. However, the petrolatum is a soft, clay-like substance and, therefore, it is not resistant to an external force or shock. It cannot be used as it is when it is to be contacted with other substances or when it is applied to, for example, an article to be placed under the ground such as a buried pipe. In such a case, it has been required to protect the same with polyethylene tapes or gum tapes. Further, since the petrolatum is adhered to a metal merely by its adhesive force and it is soft, the petrolatum has a defect that it cannot be applied to an article which will be subjected to the vibration or dynamic action. In addition, petrolatum has a low melting point and a poor thermal resistance and it could not be used at a temperature above 70° C. in general. There has been proposed an idea that the outer surface of the petrolatum coating material is coated with a cold-setting coating material or thermosetting coating material for overcoming the above defects. However, this idea also has serious defects of workability that the cold-setting coating material is sticky and that the thermosetting coating material requires a heat treatment. Another defect of those coating materials of curing type is that they require a long curing period of time and, therefore, if it rains during the operation, the working becomes impossible. Under the circumstances as above, the development of an anticorrosive petrolatum coating material for metals which can be treated easily and which has a high anticorrosive capacity has been demanded.

For the prevention of corrosion of steel structures such as pipe lines for transporting petroleum from a tanker, the following various structures have been proposed: (1) A steel structure in which the steel is directly coated with a synthetic resin: This process is effected by extruding a molten thermoplastic resin such as polyethylene resin on the steel surface to coat the latter. However, the coating film is easily broken when the steel is cut and rust is formed rapidly at the broken part. (2) A steel structure the surface of which is coated with plural coating films: This is obtained by applying a paint repeatedly at time intervals to the steel surface, since if the paint is applied thereto at once to form a thick coating film, the coating film surface contracts. However, the resulting coating layer has poor physical properties such as impact resistance and cutting resistance and, therefore, the steel surface is hurted, since the coating layer does not contain any reinforcing material such as fibers. (3) A steel structure obtained by laminating a sheet of a thermosetting fibrous reinforced plastic (hereinafter referred to as FRP) such as SMC (sheet molding compound) sheet in B-stage (semi-cured) and curing the FRP sheet. This structure has the following defects: If the FRP sheet in its B-stage is allowed to thermoset without using a mold fit for a shape of the steel, bubbles contained in the FRP sheet are expanded during the thermal polymerization of the resin to form pin holes. A protective layer of a uniform thickness cannot be formed on the steel surface, since the resin is fluidized by heat. Consequently, the anticorrosive properties of the layer is unsatisfactory. The use of the mold makes the operation complicated. (4) A structure comprising a steel on the surface of which is laminated and FRP protective layer by so-called hand lay-up lamination technique: In this structure, it is difficult to penetrate a resin in the fibers in such a manner that bubbles are not incorporated therein. Consequently, pin holes are formed, and the anticorrosive properties are poor. As described above, a structure having satisfactory anticorrosive properties could not be obtained in the prior art, though various anticorrosive structures have been proposed. Under the circumstances as above, it has been demanded to develop an anticorrosive coating material for metals having excellent anticorrosive properties such as durability, impact resistance, cutting resistance and rust preventive properties.

SUMMARY OF THE INVENTION

Accordingly, an object of the present invention is to provide a resin composition suitable for the lining of metallic members of frame-work and structures.

Another object of the present invention is to provide a prepreg sheet suitable for the lining and containing the above resin composition.

Still another object of the present invention is to provide an anticorrosive coating material for metals having excellent properties such as resistance to an external force, vibration resistance and heat resistance.

Those objects and other objects of the present invention will be apparent from the following descriptions.

After intensive investigations for the purpose of attaining the above objects, the inventor has completed the present invention. The resin composition is characterized by comprising an ultraviolet-curing resin having active OH group or COOH group, a vinyl monomer, a thickening agent and a photosensitizer.

The prepreg sheet is characterized by comprising the above resin composition. A sheet is impregnated with the above resin composition to realize so-called B-stage and to form the prepreg sheet.

An embodiment of the metallic material having anticorrosive coating is characterized in that the surface of the metallic material is coated with a coating material mainly comprising petrolatum and which coating material is further coated with a coating material mainly comprising the above resin composition.

Another metallic material having anticorrosive coating is characterized in that the surface of the metal is coated with a laminate of rust preventive coating layers and which laminate is further coated with a coating material mainly comprising the above resin composition.

DETAILED DESCRIPTION OF THE INVENTION

Figure 1:
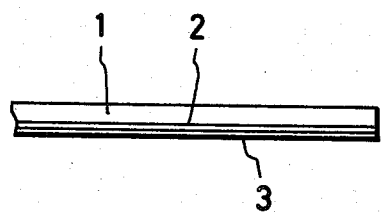
FIG. 1 is a cross section of composite prepreg sheet of the present invention.

First, the description will be made on the ultraviolet-curing resin having active OH group or COOH group, vinyl monomer, thickening agent and photosensitizer constituting the resin composition of the present invention.

(A) Ultraviolet-curing resin having active OH group or COOH group:

Those resins have OH group or COOH group at the molecular terminal or in side chains which are reactive with a radical formed in a photosensitizer which will be shown below. Typical examples of them are ethylenically unsaturated group-containing polyester resins and epoxy (metha)acrylate resins containing OH or COOH group in the molecule. These resins are aged into its B-stage by the reaction with a thickening agent such as MgO, CaO or an isocyanate compound. The term "conversion into B-stage" indicates that the resin is semi-hardened by aging through heating.

(B) Vinyl monomers:

There may be used liquid, polymerizable monomers such as styrene, vinyltoluene, methyl acrylate, methyl methacrylate, t-butylstyrene, chlorostyrene and diallyl phthalate.

(C) Thickening agents:

There may be used thickening agents reactive with OH group or COOH group of resin (A). Thickening agents reactive with the OH group include liquid polyisocyanates such as ISONATE 143L, ISONATE 135 and PAPI (products of Kasei Upjohn Co.), CR-200, and CR-300 (products of Mitsui Nisso Urethane Co.), xylene diisocyanate, tolylene diisocyanate and diphenylmethane diisocyanate. They contain two or more isocyanate groups. Thickening agents reactive with the COOH group include inorganic compounds such as MgO, CaO, Mg(OH)$_2$ and Ca(OH)$_2$ and isocyanate compounds.

(D) Photosensitizers:

They are compounds which form a radical by the irradiation with ultraviolet rays such as benzoin, benzoin methyl ether, benzoin isobutyl ether, benzyl, benzophenone and acetophenone.

The composition of the present invention comprises at least above components (A)-(D) and, if necessary, other additives such as a stabilizer, filler and a polymerization accelerator. As the stabilizers, there may be used hydroquinone, t-butylcatechol and benzoquinone which inhibit the thermal polymerization. As the fillers, there may be used talc, finely pulverized silica (such as aerosil and Cab-O-Sil) and glass fiber powder. As the polymerization promoters, there may be used, for example, manganese naphthenate. The above described composition of the present invention is converted into its B-stage by heating and hardened by irradiation with light. The temperature in the conversion into B-stage is not particularly limited and is influenced by the vinyl monomer used. For example, when styrene is used as the vinyl monomer, the composition can be converted into its B-stage by heating the same to 40°-50° C. and thereby aging the same. A sheet of this composition (which is usually in liquid form) per se in B-stage can be applied conveniently to an article of complicated radius of curvature to effect the lining. The sheet can be obtained, for example, by applying the above composition to a parting paper such as black polyethylene film to convert the same into B-stage. The sheet can be stored together with the parting paper in the form of a roll.

The description will be made on the prepreg sheets comprising the above resin composition.

A fibrous base is impregnated with the above composition and then the whole is heated to effect the aging and to convert the same into its B-stage while they are kept from ultraviolet rays. A prepreg sheet is thus obtained. As the fibrous base, there may be used preferably a glass cloth or glass cut fiber having a high ultraviolet permeability, since the composition in B-stage is cured by ultraviolet rays.

The softness and surface tack of the prepreg sheet can be controlled by varying in amount of the thickening agent.

The prepreg sheet can be stored at room temperature for a long period of time under the protection from ultraviolet rays. In curing the sheet, the reaction is completed effectively with only a small quantity of energy and the curing proceeds rapidly, since the radical-forming reaction due to the ultraviolet rays is higher than that caused by heat.

Thus obtained prepreg sheet is applied to a metal member of frame-work directly or after the application of a known ultraviolet-curing resin solution thereto as a primer and then it is exposed to ultraviolet rays. The thick anticorrosive lining is thus formed easily. This ultraviolet irradiation is effected by means of an ultraviolet irradiation device such as a mercury lamp or natural light of the sun.

The prepreg sheet of the present invention is solid and, therefore, it can be handled easily, it is odorless and it has a remarkably improved workability. Further, a lining layer of a uniform thickness can be provided, since the prepreg is sheet-shaped. For improving the adhesion of the sheet, it is preferred that a known ultraviolet-curing liquid resin or the non-aged resin composition of the present invention is previously applied to the surface of the metallic material and then the sheet is applied thereto.

It is preferred that the ultraviolet-curing resin prepreg sheet in B-stage is laminated with an adhesive. A sheet not laminated with an adhesive has a poor surface adhesive force and, therefore, a primer is required generally when it is to be applied to a material. However, if the sheet is laminated with an adhesive, the material can be coated with the sheet via the adhesive without necessitating any primer. Those composite prepreg sheets are shown in FIGS. 1 and 2.

Figure 2:
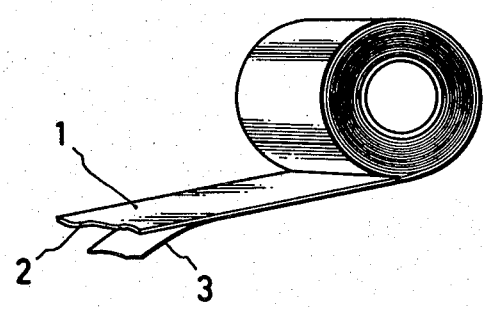
FIG. 2 is a perspective view of a tape-shaped composite prepreg sheet of the present invention.

FIG. 1 is a cross section of a composite prepreg sheet of the present invention wherein an ultraviolet-curing resin composition 1 in stage B is laminated with an adhesive 2 and further with an outside parting film 3. In the practical use, the sheet is generally shaped into a rolled tape as shown in FIG. 2. The conversion into B-stage is effected not by the irradiation with light but by heating to 40° C. for 20 hours to effect the aging. The sheet in B-stage obtained by the aging is homogeneous and has stable properties and, therefore, it is superior to sheets in B-stage obtained by the irradiation with light in the prior art.

The adhesive 2 is not particularly limited. However, rubber adhesives such as natural rubber, reclaimed rubber, isobutylene rubber and styrene-butadiene rubber as well as resin adhesives such as acrylic resin and vinyl resin are preferred.

It is preferred that a parting film or paper is applied to the outside of the adhesive 2 and the whole is rolled up and cut into tapes of a proper width. If the parting film is colored so as not to transmit the ultraviolet rays, the sheet not yet exposed to the light can be stored easily.

As materials which are coated with the sheet of the present invention, there may be mentioned steel plates, steel pipes, metallic structures and plastic products. They are coated with the sheet directly or via a coating layer of petrolatum or the like. After coating, the sheet of the present invention can be cured completely by the irradiation with ultraviolet rays by means of an ultraviolet lamp or by exposing the same to the sun in case of outdoor structures.

The composite prepreg sheet of the present invention has the following advantages:

(1) Since the sheet has an adhesive layer, it can be applied to a material in the same manner as that of an ordinary adhesive tape. The sheet has thus an excellent workability.

(2) Since the ultraviolet-curing resin composition in B-stage is used, the sheet exhibits a high flexibility when it is applied to a subject and then it is converted to a stiff, cured resin protective layer by the irradiation.

According to the present invention, a metallic material having an anticorrosive coating is provided which comprises a metallic material the surface of which is coated with a coating material mainly comprising petrolatum and which coating material is further coated with another coating material mainly comprising the above resin composition.

The metallic materials used herein include plates, pipes, other structures and devices made of mainly metals. The coating materials mainly comprising petrolatum include known petrolatums per se which are obtained from petroleum distillation residues, and sheets or tapes comprising a cloth impregnated or coated with petrolatum.

The coating material mainly comprising the above resin composition is, for example, a cured sheet of the above resin composition per se in B-stage, a cured product of the above prepreg sheet or a cured product of the composite prepreg sheet. The coating material further includes a material obtained by applying the above resin composition to a fibrous sheet, converting the same into B-stage and curing the same.

The metallic material having anticorrosive coating of the present invention comprises a metallic material the surface of which is coated with the above coating material mainly comprising petrolatum and the surface of which coating is further coated with the coating material mainly comprising the above resin composition. In the preparation of the anticorrosive metallic material, those coating materials may be applied separately; or tapes or sheets may be applied to the surface of the metallic material to form coatings; or a composite coating material comprising a laminate of both coating materials may be applied to the metallic material. In the respective cases, non-cured materials are used and they are cured after the coating.

Figure 3:
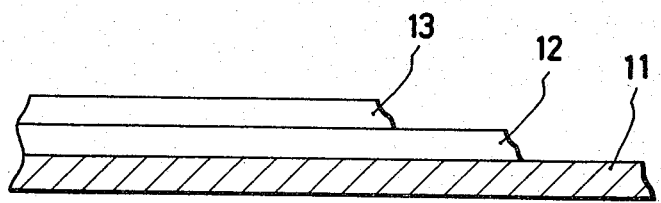
FIG. 3 is a cross section of a metallic material having an anticorrosive coating of the present invention.

FIG. 3 is a cross section of the metallic material having anticorrosive coating of the present invention. The surface of a metallic material 11 is coated with a petrolatum coating material 12 and which coating is further coated with a coating material 13 mainly comprising the resin composition.

Figure 4:
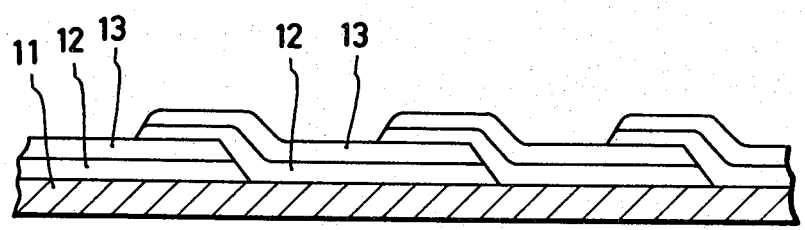
FIG. 4 is a cross section of another metal material having an anticorrosive coating of the present invention.

FIG. 4 shows another embodiment of the metallic material having anticorrosive coating of the present invention. A tape of composite coating material comprising a laminate of the petrolatum coating material 12 and the coating material 13 mainly comprising the resin composition in wound round the surface of the pipe-shaped metallic material 11.

The coating material 13 mainly comprising the resin composition used in the present invention is in its B-stage, i.e. it is in the form of a flexible, soft sheet before it is applied to the metallic surface and, therefore, it can be applied to metallic materials of various shapes. After the application, the most outside layer of the coating material 13 is cured by the irradiation with ultraviolet rays by means of an ultraviolet irradiation device or by the exposure to the sunlight in case of an outdoor structure to form the coating having a quite high surface hardness.

The metallic material having anticorrosive coating of the present invention has the following advantages:

(1) Since the metallic surface is anti-corrosive due to the petrolatum and the coating layer comprising the resin composition cured by ultraviolet rays is further provided on the anticorrosive layer, the metallic material has a high surface hardness and excellent heat resistance, impact resistance and insulating properties.

(2) The uncured coating material mainly comprising the resin composition may be handled in the form of a two-ply roll with a black film as described above. After coating the metallic material with the same, it is cured by the irradiation with ultraviolet rays in a very short time (several seconds). Thus, a high workability is obtained. According to the present invention, problems in the prior art such as stickiness observed in the lining with cold-curing coating material or complicated heat treatment operations in case of the heat-curing coating material are overcome.

Further, the present invention provides a metallic material having anticorrosive coating which comprises a metallic material the surface of which is laminated with a rust-proof paint layer and the surface of which layer is coated with the coating material mainly comprising the resin composition. The coating material mainly comprising the resin composition used in this case is the same as above. For example, it is a cured sheet of the above resin composition per se in B-stage, a cured product of the above prepreg sheet or a cured product of the composite prepreg sheet. The coating material further includes a material obtained by applying the above resin composition to a fibrous sheet, converting the same into its B-stage and curing the same.

Figure 5:
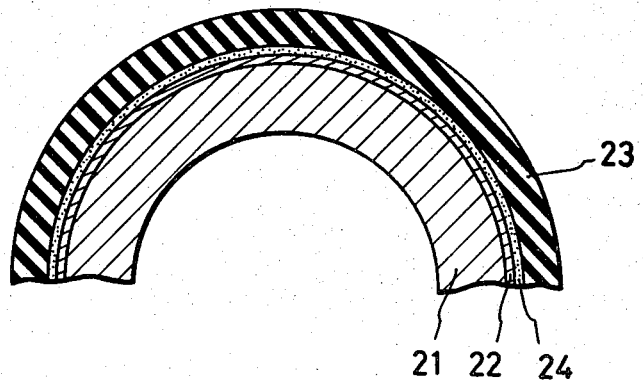
FIG. 5 is a partial cross section of a metallic pipe which is an example of metallic materials having an anticorrosive coating of the present invention.

FIG. 5 is a partial cross section of a metallic pipe which is an embodiment of the metallic material having anticorrosive coating. 21 is the body of a metallic pipe. 22 is a rust-proof paint layer laminated on the surface of the body 21. 23 is a layer of the coating material mainly comprising the resin composition formed on the surface of the layer 22 to form a laminate. 24 is a primer layer for bonding the rust-proof paint layer 22 with the coating material layer 23.

Such an anticorrosive structure can be obtained by applying a rust-proof paint containing a rust resisting pigment such as zinc chromate, red lead or zinc powder or a rust-proof paint containing tar to the surface of the metallic pipe body 21, allowing the same to stand for a time required for curing, then applying the uncured coating material mainly comprising the resin composition in its B-stage to the surface of the rust-proof paint layer 22 via a proper primer and curing the coating material by the exposure to sunlight or by the irradiation with ultraviolet rays by means of an ultraviolet lamp or the like. Since the curing can be effected by merely the irradiation with light, the protective layer, i.e. coating material layer 23 on the metallic pipe body 21 is free of pin holes which were unavoidable in the prior art.

The metallic material having anticorrosive coating of the present invention thus comprises the metallic pipe body 21, the rust-proof coating layer 22 and the pin hole-free coating material layer 23 in a body. Therefore, it has excellent physical properties such as durability, impact resistance and cutting resistance. Further, since the rust-proof paint layer 22 is combined with the coating material layer 23 in a body, the permeation of water vapor or oxygen into the metallic pipe body 21 is reduced remarkably. Even if the coating material layer 23 is damaged, the rusting of the metallic pipe body can be prevented. Even if the rust-proof paint layer 22 is cut or cracked, the growth of rust can be inhibited. Both rust-proof paint layer 22 and coating material layer 23 have excellent insulating properties. The metallic material having anticorrosive coating of the present invention has the above described properties and, therefore, can be employed for the multiple anticorrosive paint method generally employed in marine structures. For example, the surface of a metallic member of framework to which a thick film-forming inorganic zinc-rich paint, a thick film-forming epoxy paint and a polyurethane paint have been applied to form layers may be further coated with the coating material mainly comprising the uncured resin composition to form a laminate and then it is cured.

The following examples further illustrate the present invention, which by no means limit the invention.

EXAMPLE 1

| | |
|---|---|
| Unsaturated polyester resin having an ethylenically unsaturated group and active COOH group/styrene solution | 100 parts by weight |
| Benzoin isobutyl ether (photosensitizer) | 2.0 |

| | |
|---|---|
| MgO (thickening agent) | 1.5 |
| Aerosil (silica filler) | 3.0 |

The above components were mixed together sufficiently with a stirrer. Glass chopped strand mat CM 235F (a product of Asahi Fiber Glass Co.) was impregnated with the mixture. The mat was rolled up with a black polyethylene film of a thickness of 100μ to form a two-ply rolled sheet. The sheet was cured in a room at 35°-40° C. for about 20 hours to obtain a solid prepreg sheet having a thickness of 0.7 m/m and some tack.

The prepreg sheet was wrapped in a black polyethylene film and allowed to stand at a room temperature of 15°-25° C. The sheet kept its flexibility and some tack for longer than one month.

The prepreg sheet was applied to a blast-treated steel plate by contact bonding to form a two-ply film by means of a rubber roll and irradiated with light by using a Cure Light Tester (a metal halide lamp of Iwasaki Denki Co.; lamp input 6 KW, 490 m/m, 120 W/cm, irradiation distance 15 cm) for 5 seconds. Thus, an FRP lining layer was formed having tack-free cured surface, a Barcol hardness of about 50 and a thickness of about 1.2 m/m.

A 3-ply laminate was prepared from the prepreg sheet and the laminate was interposed between two LUMIRROR Films (a product of Toray Co.) and exposed to sunlight (in the afternoon, early in October). The resulting cured product had a Barcol hardness of 45-50 which was substantially equivalent to that cured by ultraviolet rays.

EXAMPLE 2

| | |
|---|---|
| Vinyl ester resin having active COOH group/styrene solution | 100 parts by weight |
| MgO (thickening agent) | 2 |
| Benzoin iso-butyl ether (photosensitizer) | 2 |
| 5% Solution of manganese naphthenate in dibutyl phthalate (polymerization promotor) | 0.2 |

The above components were mixed together sufficiently with a stirrer. Glass chopped strand mat CM-305 (a product of Asahi Fiber Glass Co.) was impregnated with the mixture. The mat was rolled up with a black polyethylene film of a thickness of 100μ and cured in a room at 35°-40° C. for about 20 hours to obtain a solid prepreg sheet having a thickness of about 0.9 m/m and some tack.

A mixture of the following composition was applied to an outdoor pipe for cooling water having a diameter of about 300 m/m to form a thin film as primer:

| | |
|---|---|
| Vinyl ester resin | 80 parts by weight |
| Styrene monomer | 20 |
| Benzoin iso-butyl ether | 2 |

Immediately thereafter, the pipe was wrapped with the above prepreg sheet cut into a tape of a width of 100 m/m. It was exposed to sunlight (in the afternoon, early in October). After the exposure for about 15-20 minutes, the surface became tack-free and an FRP lining layer was formed. Two hours after, the surface hardness of the lining layer was measured. It had a Barcol hardness of 40-50. The curing reaction had substantially completed.

A mixture of the following composition was applied to a blast-treated steel plate to form a thin film as primer:

| | |
|---|---|
| Vinyl ester resin | 80 parts by weight |
| Styrene monomer | 20 |
| Benzoin iso-butyl ether | 2 |

Immediately thereafter, the prepreg sheet was applied to the steel plate by contact bonding to form a one-ply film by means of a rubber roll and irradiated with light by using the above Cure Light Tester (a product of Iwasaki Denki Co.) for 8 seconds.

Air was not introduced between the lining layers and an FRP lining layer having a Barcol hardness of about 40-50 was obtained.

EXAMPLE 3

| | |
|---|---|
| Vinyl ester resin styrene solution | 100 parts by weight |
| Polyisocyanate [ISONATE 135: a product of Kasei Upjohn Co.) (thickening agent) | 6 |
| Benzoin iso-butyl ether | 2 |
| 5% Solution of manganese naphthenate in dibutyl phthalate | 0.2 |

The above components were mixed together sufficiently with a stirrer. Glass chopped Strand mat CM-305 was impregnated with the mixture. The mat was rolled up with a black polyethylene film of a thickness of 100μ and cured in a room at 40° C. for 20 hours to obtain a solid prepreg sheet having a thickness of about 0.9 m/m and some tack.

A mixture of the following composition was applied to a blast-treated steel plate to form a thin film as primer:

| | |
|---|---|
| Vinyl ester resin/styrene solution | 100 parts by weight |
| Benzoin iso-butyl ether | 2 |

Immediately thereafter, the prepreg sheet was applied to the steel plate by contact bonding to form a 2-ply film by means of a rubber roll and exposed to sunlight in the afternoon, early in October, for one hour to obtain an FRP lining layer having a Barcol hardness of about 45.

EXAMPLE 4

Samples having following structures A, B, C, D and E were subjected to impact resistance test and immersion test in a common salt solution. The results are shown in a table given below.

A: A blast-treated iron plate was coated with a zinc-rich paint containing epoxy resin as base (trade name: SD Zinc Primer-ZE-500; a product of Kansai Paint Co.). A photo-curing FRP sheet in B-stage was applied thereto via a photo-setting primer to form a laminate. Then, the whole was exposed to sunlight for 20 minutes to cure the same.

B: A sample obtained in the same manner as above A except that a lead chromate pigment-containing paint (trade name: Epomarine primer: a product of Kansai Paint Co.) was used as rust-proof paint in place of the zinc-rich paint containing epoxy resin base.

C: A blast-treated iron plate was coated with the above described zinc-rich paint containing epoxy resin base. Epoxy resin paints (trade names: Epomarine A/CR and Epomarine B/T: products of Kansai Paint Co.) were applied thereto in two layers.

D: A blast-treated iron plate was pasted with a photo-curing FRP sheet in B-stage by means of a photo-curing primer and the whole was exposed to sunlight for 20 minutes to cure the same.

E: A blast-treated iron plate was coated with a lead chromate pigment-containing paint. An FRP layer was formed thereon by hand lay-up using chopped strand mat and a composition comprising 100 parts by weight of a cobalt naphthenate-containing unsaturated polyester resin and 1.0 part by weight of methyl ethyl ketone peroxide.

(1) Impact resistance test:

The anticorrosive surface was pounded with the rust removing hammer.

(2) Immersion test in a common salt solution:

(a) Change in appearance:

A sample was immersed in 5% aqueous NaCl solution at 50° C. for 3 minutes and a change in appearance was examined.

(b) Growth of rust (mm)

A sample cut in a width of 2 mm which cut reached the metallic material surface was immersed in 5% aqueous NaCl solution at 50° C. for 3 months. Degree of growth of rust was measured after removing the coating.

TABLE

|  | A | B | C | D | E |
|---|---|---|---|---|---|
| Impact Resistance Test | Good | Good | * | Good | Good |
| Immersion Test in Common Salt Solution |  |  |  |  |  |
| (a) Change in Appearance | No Change | No Change | ** | No Change | *** |
| (b) Growth of Rust (mm) | 2.0–3.2 | 2.0–3.5 | 2.0–3.5 | 6.5–8.3 | 2.0–3.8 |

*The coating film was broken and the metallic surface became exposed.
**Blisters were produced in the coating film.
***Blisters were produced partially in the coating film.

The above table clearly shows that the samples of the present invention (samples A and B) were superior to other samples (samples C, D and E) in both tests.

What is claimed is:

1. A prepreg sheet comprising a fibrous base and a B-staged ultraviolet-curing composition containing an ultraviolet-curing resin having an active OH group or COOH group, a vinyl monomer, a thickening agent which is reactive with the active OH group or COOH group of the ultraviolet-curing resin and a photosensitizer.

2. A prepreg sheet according to claim 1, wherein the surface of which is laminated with an adhesive.

3. A metallic material having anti-corrosive coating, characterized in that the surface of the metallic material is coated with a coating material mainly containing an ultraviolet-curing resin composition containing an ultraviolet-curing resin having an active OH group or COOH group, a vinyl monomer, a thickening agent which is reactive with the active OH group or COOH group of the ultraviolet-curing resin, and a photosensitizer.

4. A metallic material having anti-corrosive coating, characterized in that the surface of the metallic material is laminated with a petrolatum layer, the surface of which layer is further coated with a coating material mainly containing an ultraviolet-curing resin composition containing an ultraviolet-curing resin having an active OH group or COOH group, a vinyl monomer, a thickening agent which is reactive with the active OH group or COOH group of the ultraviolet-curing resin, and a photosensitizer.

5. A metallic material having anticorrosive coating, characterized in that the surface of the metallic material is coated with a rust-proof paint layer to form a laminate and the surface of the rust-proof paint layer is further coated with a coating material mainly containing an ultraviolet-curing resin composition containing an ultraviolet-curing resin having an active OH group or COOH group, a vinyl monomer, a thickening agent which is reactive with the active OH group or COOH group of the ultraviolet-curing resin, and a photosensitizer.

6. A metallic material having anticorrosive coating according to claim 3, 4 or 5, wherein the coating material mainly containing the ultraviolet-curing resin composition is B-staged prepreg sheet made of an ultraviolet-curing composition containing an ultraviolet-curing resin having active OH group or COOH group, a vinyl monomer, a thickening agent which is reactive with the active OH group or COOH group of the ultraviolet-curing resin, and a photosensitizer.

7. A metallic material having anticorrosive coating according to claim 3, 4 or 5, wherein the coating material mainly containing the ultraviolet-curing resin composition is B-staged composite prepreg sheet obtained by applying an adhesive to the surface of a prepreg sheet made of an ultraviolet-curing composition containing an ultraviolet-curing resin having an active OH group or COOH group, a vinyl monomer, a thickening agent which is reactive with the active OH group or COOH group of the ultraviolet-curing resin, and a photosensitizer to form a laminate.

* * * * *